US009183363B1

(12) United States Patent
Millwee

(10) Patent No.: US 9,183,363 B1
(45) Date of Patent: *Nov. 10, 2015

(54) METHOD AND SYSTEM OF VERIFYING AND AUTHENTICATING CONSUMER REPORTING HISTORY

(71) Applicant: IREVIEWNOW LLC, Southlake, TX (US)

(72) Inventor: Steven C. Millwee, Athens, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/142,903

(22) Filed: Dec. 29, 2013

Related U.S. Application Data

(63) Continuation of application No. 13/153,454, filed on Jun. 5, 2011, now Pat. No. 8,646,101, and a continuation of application No. 11/351,968, filed on Feb. 10, 2006, now Pat. No. 7,979,908.

(60) Provisional application No. 60/593,764, filed on Feb. 11, 2005.

(51) Int. Cl.
*H04L 29/06* (2006.01)
*G06F 21/31* (2013.01)

(52) U.S. Cl.
CPC ..................................... *G06F 21/31* (2013.01)

(58) Field of Classification Search
CPC ........................................................ G06F 21/31
See application file for complete search history.

(56) References Cited

U.S. PATENT DOCUMENTS

| | | | | |
|---|---|---|---|---|
| 5,694,472 A * | 12/1997 | Johnson et al. | ............... | 713/189 |
| 6,415,295 B1 | 7/2002 | Feinberg | ............................... | 1/1 |
| 6,564,207 B1 | 5/2003 | Abdoh | .................. | 1/1 |
| 8,175,874 B2 | 5/2012 | Shimhi | ......................... | 704/240 |
| 2001/0047275 A1 | 11/2001 | Terretta | ............................. | 705/1 |
| 2002/0116266 A1 | 8/2002 | Marshall | ......................... | 705/14 |
| 2002/0116634 A1 | 8/2002 | Okubo | .......................... | 713/200 |
| 2003/0105959 A1* | 6/2003 | Matyas et al. | ................ | 713/168 |
| 2003/0154406 A1 | 8/2003 | Honarvar et al. | ............. | 713/201 |
| 2004/0078335 A1 | 4/2004 | Calvesio et al. | ................ | 705/50 |
| 2004/0088173 A1 | 5/2004 | Mather | ............................. | 705/1 |
| 2004/0111359 A1 | 6/2004 | Hudock | .......................... | 705/38 |
| 2004/0122904 A1 | 6/2004 | Kim | .............................. | 709/206 |
| 2005/0055231 A1 | 3/2005 | Lee | ................................... | 705/1 |
| 2006/0018520 A1 | 1/2006 | Holloran | ...................... | 362/116 |

FOREIGN PATENT DOCUMENTS

| WO | WO 0133421 A1 | 5/2001 |
|---|---|---|
| WO | WO 03071443 A1 | 8/2003 |

OTHER PUBLICATIONS

"Repair your own credit", 3rd Edition, Bob Hammond, ISBN 1-56414-517-4, Pub. Year: 2001.

(Continued)

*Primary Examiner* — Mohammad L Rahman
(74) *Attorney, Agent, or Firm* — Smith Risley Tempel Santos LLC; Steven P. Wigmore

(57) ABSTRACT

A method and system of verifying and authenticating personal history data of a subject comprising requesting the personal history data of the subject from a data base provider, searching the data base for the personal history data of the subject, transmitting the requested personal history data to the requester, reviewing the personal history data by the subject and verifying the accuracy of the personal history data by the subject and authenticating the verified personal history data by the subject.

20 Claims, 6 Drawing Sheets

(56) References Cited

OTHER PUBLICATIONS

"Repair your own credit", 3rd Edition, Bob Hammond, ISBN 1-56414-517-4.

Hill, H. J. (1991). Impact of Alerting the Delinquent Debt Threshold Used for Background Inversigation Expansion on the Deinal Rate of Security Clearences.
Wiskoff, M. F., & Zimmerman, R. A. (1994). Military Applicant Security Screening (MASS): System Development and Evaluation.

* cited by examiner

VERIFICATION REQUIRED
COPY MUST BE GIVE BY EMPLOYER TO APPLICANT/EMPLOYEE

Date: 02-03-2006
Social Security #: 999999999
DOB: 07111959
STI Account #: STITEST
Employer: SECURTEST INC
Subject: John Doe

SOCIAL SECURITY TRACE

THE SOCIAL SECURITY NUMBER IS VALID AND WAS ISSUED IN FLORIDA. THIS SEARCH DOES NOT VALIDATE THE SUBJECT'S NAME OR IDENTITY TO THIS SOCIAL SECURITY NUMBER. YOU SHOULD ALWAYS VERIFY IDENTITY AND SOCIAL SECURITY NUMBER ACCORDING TO I-9 REGULATIONS.

UNITED STATES TERRORIST WATCH LIST SEARCH

---

This applicant's name is not on the current terrorist watch list.

Provide the applicant the instructions along with this history report. YOU SHOULD HAVE THE APPLICANT OR EMPLOYEE PRESENT WHEN YOU VIEW THIS REPORT TO EXPEDITE THE AUTHENTICATION OF THE RECORD. You can have the applicant complete the verification and authentication online or obtain the faxable version. A copy follows the end of this report.

NOTICE TO APPLICANT

Text

FIG. 4

All information must be completed.

What is the Report # on page 1 of the report:

What is the name of the employer or prospective employer requesting the report?

Your eMail:

Your Phone #:

All information must be completed.

Your First Name

Your Middle Name

Your Last Name

Your Social Security Number

Your Date of Birth (mm/dd/yyyy)

Your Home Street Address

City

State

ZIP Code

Check the box for your answer

A. Did you authorize this report? ☐ Yes ☐ No
1. Is the criminal history report your criminal history? ☐ Yes ☐ No ☐ Some of it is
2. Is this criminal history report accurate? ☐ Yes ☐ No ☐ Some of it is

FIG. 5

3. I have criminal convictions that are not on this report. ☐ Yes ☐ No

4. I have been convicted of a misdemeanor involving violence. ☐ Yes ☐ No

5. I have been convicted of a felony involving violence. ☐ Yes ☐ No

6. I have been convicted of a felony in the last 7 years. ☐ Yes ☐ No

7. I am on probation or parole. ☐ Yes ☐ No

8. If an applicant for employment, I no longer wish to be considered for employment and withdraw my employment application. ☐ Yes ☐ No 9. I should be considered for employment despite my criminal record. ☐ Yes ☐ No 10. I did not disclose a criminal conviction on the employment application. ☐ Yes ☐ No 11. Please explain why the employer should consider your employment application (or employment status if already employed by the employer) and what you have done to better yourself despite your past record. Type/Print in detail your answer.

12. Describe which records by date and case # if listed ARE NOT yours. (We search county state and federal courts to verify records that you say are not yours. Untruthfulness is grounds for not being hired or terminated. Type/Print in detail your answer.

I have carefully reviewed this information and certify that it is true and correct. By clicking on Submit-Finished, I hereby indemnify and forever hold harmless searching entity, its strategic partners and my prospective or current employer from any and all claims arising out of my validating this information with my answers. My answers will become part of my record to help clarify, correct or validate my biographical information which is exclusively owned by searching entity.

Signature if mailing or faxing or otherwise type your full name in box.

FIG. 5 (cont'd)

METHOD AND SYSTEM OF VERIFYING AND AUTHENTICATING CONSUMER REPORTING HISTORY

CROSS-REFERENCE

This is a utility application of provisional application Ser. No. 60/593,769, filed Feb. 11, 2005.

BACKGROUND OF THE INVENTION

1. Field of the Invention

A method of verifying and authenticating personal history data or information from at least one data base.

2. Description of the Prior Art

There are numerous data bases available to acquire and verify personal information for numerous reasons such as individuals seeking or continuing employment, financial transactions such as loans and other selection or qualifying processes.

Unfortunately, information obtained from various data bases is often incomplete or inaccurate. This can result in wrongfully denying an applicant or individual an opportunity he or she might otherwise be eligible for. If an individual were permitted to review the information prior to a decision being made based upon the erroneous information, the deficiency could generally be rectified. Moreover, when the information is derogatory, individuals may not be afforded the opportunity to explain or mitigate the negative information.

Thus, there is a need for a method or system that provides a means for an individual to review, verify, authenticate and explain data or information obtained on his or her personal history that may impact on the decision making process.

SUMMARY OF THE INVENTION

The present invention relates to a method and system of verifying and authenticating personal history data of a subject obtained from a data base provider requested by a third party.

The subject invention provides a mode to authenticate and verify applicant or consumer information such as criminal records or credit records using a self-reporting questionnaire based system that allows a subject to verify his or her personal information through a series of biographical based questions.

The system may use remote computers operatively coupled or linked to at least one data base provider by corresponding data communication links capable of transferring data and information therebetween.

The method and system for verifying and authenticating personal history data of a subject obtained from a data base provider requested by a third party comprises authorizing the third party to conduct a personal history data base search of the subject from the data base provider, requesting the personal history data of the subject from the data base provider, searching the data base of the data base provider for the personal history data of the subject, transmitting the personal history data of the subject to the requesting third party, providing the subject with the received personal history data for examination and verification, verifying and authenticating the personal history data by the subject and reviewing the authenticated personal history data by the third party.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and object of the invention, reference should be had to the following detailed description taken in connection with the accompanying drawings in which:

FIG. 4 depicts a personal history report to be verified and authenticated using the method and system of the present invention.

FIG. 5 depicts the self-reporting questionnaire for use with the method and system of the present invention.

Similar reference characters refer to similar parts throughout the several views of the drawings.

DETAILED DESCRIPTION OF THE INVENTION

The present invention relates to a method and system of verifying and authenticating personal history data or information of an individual or subject obtained from a data base provider requested by a third party.

The system provides a mode to authenticate and verify applicant or consumer information such as criminal convictions and credit records. The invention is a self-reporting questionnaire based system that permits a subject to verify his or her personal information through a series of biographical based questions. By self-reporting and authenticating adverse or derogatory data disclosed during a background investigation search of various databases available by government and Credit Reporting Agencies (CRA), a consumer, credit provider, employer or prospective employer can save valuable time and costs associated with sending employees, contractors, or Credit Reporting Agencies to the courts or other repositories to verify the record. The authenticated records and rehabilitative efforts undertaken by the consumer, job candidate or employee are stored in a database to assist employers or other decision makers in hiring or retention decisions and credit providers in business decisions based on the verified and authenticated information. Moreover, the system allows consumers, applicants or employees to provide detailed reasons why they should be granted credit, hired or their employment continued despite adverse or derogatory information. The business process creates a cost effective and efficient method that saves time, expenses, misidentification of erroneous information that are not the individual's record due to similarities in names or other personal identifying information.

Figure 1:
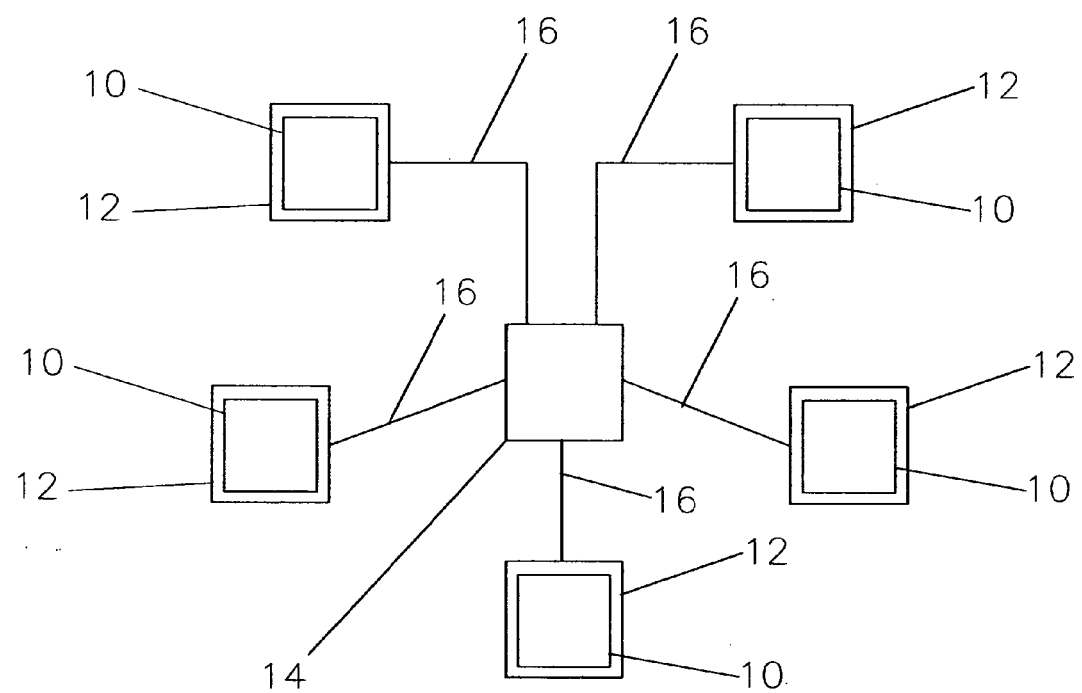
FIG. 1 is a schematic of the system of the present invention in a network environment.

The preferred embodiment of the present invention can be implemented through the use of the Internet to request and transfer data and information. As shown in FIG. 1, the system comprises third party computers 10 located at corresponding sites 12 operatively coupled or linked to at least one data base provider 14 by corresponding data communication links 16 capable of transferring data and information therebetween.

Figure 2:
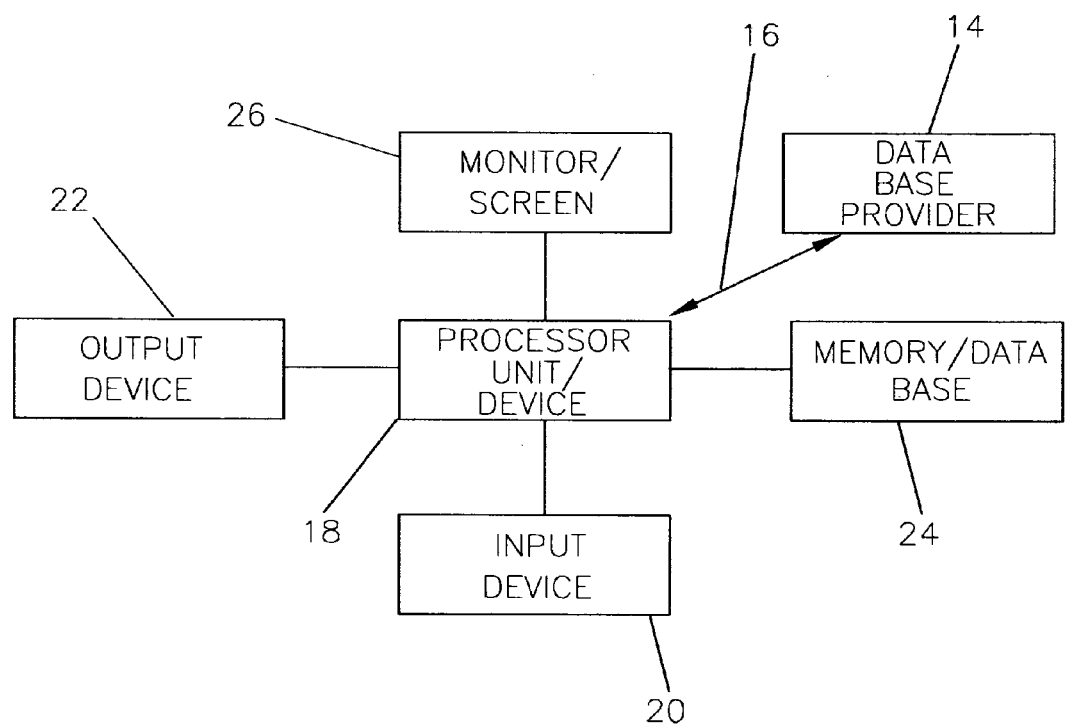
FIG. 2 depicts a computer used to implement the method and system of the present invention in a network environment.

As depicted in FIG. 2, each third party computer 10 may comprise a processor unit or device 18 operatively coupled to a keyboard or input device 20, a printer or output device 22, a memory or data base 24 and a monitor or screen 26. As previously described, the third party computers 10 are operatively coupled to at least one data base provider 14 through the data communication links 16. The data communication links 16 may comprise any suitable state of the art transmitting/ receiving system or means.

As discussed more fully hereinafter, the method and system of the present invention for verifying and authenticating personal history data of a subject obtained from a data base provider requested by a third party comprises subscribing to the data base provider by the third party, assigning the third party a discrete subscriber identification pass-word by the data base provider, authorizing the third party to conduct a personal history data base search of the subject, requesting the personal history data of the subject from the data base provider, searching the data base of the data base provider for personal history data of the subject, transmitting the personal history data of the subject to the requesting third party, providing the subject with the received personal history data for examination and verification, verifying and authenticating the personal history data and reviewing the authenticated personal history data by the third party.

Figure 3:
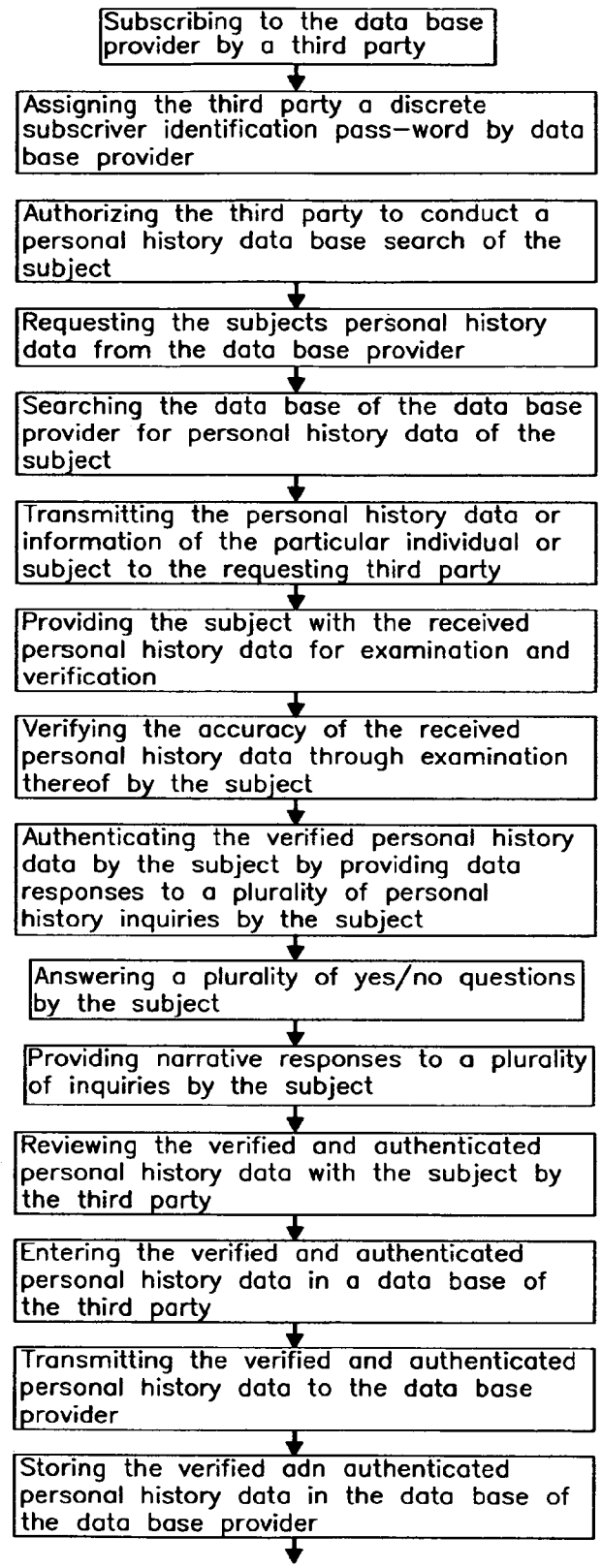
FIG. 3 is a flow chart of the method and system of the present invention.

The method of the present invention is best understood with reference to FIG. 3. Specifically, the method and system of verifying and authenticating personal history data of a subject obtained from a data base provider by an inquiry by a third party comprises the steps of subscribing to the data base provider by the third party, assigning the third party a discrete subscriber identification pass-word by the data base provider, authorizing the third party to conduct a personal history data base search of the subject, requesting the subject's personal history data from the data base provider using the discrete subscriber identification pass-word, searching the data base of the data base provider for the personal history data of the subject, transmitting the personal history data of the subject from the data base provider to the requesting third party, providing the subject with the personal history data received from the data base provider for examination and verification, verifying the accuracy of the personal history data through examination thereof by the subject, authenticating the verified personal history data by the subject by completing a plurality of personal history inquiries, answering a plurality of elective responses by the subject to Yes or No questions, providing narrative responses by the subject to a plurality of inquiries, reviewing the verified and authenticated personal history data by the third party and entering the verified and authenticated personal history data in a data base of the third party, transmitting the verified and authenticated personal history data to the data base provider and entering the verified and authenticated personal history data in the data base of the data base provider.

As shown in FIGS. 1 and 2, the subscribing, assigning, requesting and transmitting functions or steps and other communications between the data base provider and the third parties may be accomplished with state of the art technology schematically depicted in FIGS. 1 and 2.

FIG. 4 shows an outlined example of a personal history report obtained from the data base provider for review, verification and authentication by the subject at the behest of the third party.

The authentication process is accomplished by completing the plurality of personal history inquiries by the subject, answering a plurality of questions by the subject, providing narrative responses to a plurality of inquiries by the subject shown in FIG. 5.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A computer-implemented method for retrieving and storing personal history that is collected from a person of interest of a search after the search is conducted, the search being ordered by a third party, comprising the steps of:

providing a database comprising background information about a plurality of individuals in which the background information has not been checked by any of the individuals and in which access to the database by any of the individuals is restricted and information therein cannot be pre-screened and accessed by one or more of the individuals;

storing at least one of: personal information, YES and NO answers, and answers to statements in the database as an appendix to information about the person of interest, the personal information with at least one of the YES and NO answers and answers to statements providing context for the third party such that any adverse or derogatory data in the background information about the person of interest is mitigated;

displaying the background information with the appendix to the third party;

receiving a search request for background information about a person of interest, the person of interest comprising one of the plurality of individuals in the database;

transmitting data comprising background information about the person of interest over a computer network to the third party;

after transmitting the data comprising the background information about the person of interest, then transmitting identical background information about the person of interest over the computer network to the person of interest;

displaying the background information about the person of interest to the person of interest on a display device;

displaying a plurality of fields on a display device that prompt the person of interest to enter personal information;

receiving personal information in the fields from the person of interest;

displaying a plurality of least one of YES and NO questions and multiple choice answer questions related to the background information about the person of interest on the display device that prompt the person of interest to answer the at least one of the YES and NO questions and multiple choice answer questions;

receiving at least one of YES and NO answers from the person of interest corresponding to the YES and NO questions;

receiving at least one answer from the person of interest corresponding to the multiple choice answer questions;

transmitting the personal information with at least one of the YES and NO answers and multiple choice answers over the computer network to the database; and associating the personal information and at least one of the YES and NO answers and multiple choice answers with the background information about the person of interest.

2. The method of claim 1, further comprising: transmitting one or more passwords over a computer network to only a third party who is a subscriber of the database.

3. The method of claim 2, further comprising: receiving the one or more passwords from a computer network from the third party; and providing the third party access to the database.

4. The computer-implemented method of claim 1, wherein the YES and NO questions and multiple choice answer questions comprise at least one of: a question asking whether the search request was authorized by the person of interest, a question asking if any information in the background information about the person of interest is correct, a question asking whether the person of interest has additional information about the report.

5. The computer-implemented method of claim 4, wherein the background information comprises answers to at least one of: question asking whether the person of interest has been convicted of any crime, a question asking whether the person of interest has been convicted of a misdemeanor, a question asking whether the person of interest has been convicted of a felony, and a question asking whether the person of interest is on parole.

6. The computer-implemented method of claim 1, further comprising displaying at least one field for entering narrative data on a display device.

7. The computer-implemented method of claim 6, further comprising receiving narrative data corresponding to the at least one field.

8. The computer-implemented method of claim 7, further comprising: transmitting the narrative data with the personal data, YES and NO answers, and multiple choice answers over the computer network to the database.

9. The computer-implemented method of claim 8, further comprising: associating the narrative data with the background information about the person of interest.

10. The computer-implemented method of claim 9, further comprising: storing the narrative data in the database along with the personal data, YES and NO answers, and multiple choice answers as the appendix to the background information about the person of interest, the personal information, YES and NO answers, multiple choice answers, and narrative data providing context for the third party such that any adverse or derogatory data in the background information about the person of interest is mitigated.

11. The computer-implemented method of claim 1, wherein the background information stored in the database comprises at least one of credit report data, public background reports, private background reports, current employment data, past employment data, and criminal background data.

12. The computer-implemented method of claim 11, wherein the personal information comprises at least one of a first name of the person of interest, a last name of the person of interest, a social security number of the person of interest, a birth date of the person of interest, a street address of the person of interest, a city of residence for the person of interest, a state of residence for the person of interest, and a zip code.

13. A computer system for retrieving and storing personal history that is collected from a person of interest of a search after the search is conducted, the search being ordered by a third party, the system comprising:

a processor to provide a database comprising background information about a plurality of individuals in which the background information has not been checked by any of the individuals and in which access to the database by any of the individuals is restricted and information therein cannot be pre-screened and accessed by one or more of the individuals;

a processor to store personal information, YES and NO answers, and multiple choice answers in the database as an appendix to information about the person of interest, the personal information with the YES and NO answers and multiple choice answers providing context for the third party such that any adverse or derogatory data in the background information about the person of interest is mitigated; and a display device to display the background information with the appendix to the third party;

a processor to receive a search request for background information about a person of interest, the person of interest comprising one of the plurality of individuals in the database;

a processor to transmit data comprising background information about the person of interest over the computer network to the third party;

after the data comprising the background information about the person of interest is transmitted by a processor, then a processor to transmit identical background information about the person of interest over the computer network to the person of interest;

a display device to display the background information about the person of interest to the person of interest on the display device;

a display device to display a plurality of fields on the display device that prompt the person of interest to enter personal information;

a processor to receive the personal information in the fields from the person of interest;

a display device to display a plurality of YES and NO questions and one or more multiple choice questions related to the background information about the person of interest on the display device that prompt the person of interest to answer the YES and NO questions and multiple choice questions;

a processor to receive at least one of YES and NO answers and one or more multiple choice answers from the person of interest corresponding to the YES and NO questions and multiple choice questions;

a processor to transmit the personal information with the YES and NO answers and multiple choice answers over the computer network to the database; and a processor to associate the personal information and YES and NO answers and multiple choice answers with the background information about the person of interest.

14. The computer system of claim 13, further comprising a processor to transmit one or more passwords over a computer network to only a third party who is a subscriber of the database.

15. The computer system of claim 14, further comprising a processor to receive the one or more passwords from a computer network from the third party.

16. The computer system of claim 15, further comprising a processor to provide the third party access to the database.

17. The computer system of claim 13, wherein the one or more processors are further operable to display at least one field for entering narrative data on a display device.

18. The computer system of claim 17, wherein the one or more processors are further operable to transmit the narrative data with the personal data, YES and NO answers, and multiple choice answers over the computer network to the database.

19. The computer system of claim 18, wherein the one or more processors are further operable to associate the narrative data with the background information about the person of interest.

20. The computer system of claim 19, wherein the one or more processors are further operable to store the narrative data in the database along with the personal data, YES and NO answers, and multiple choice answers as the appendix to the background information about the person of interest, the personal information, YES and NO answers, multiple choice answers, and narrative data providing context for the third party such that any adverse or derogatory data in the background information about the person of interest is mitigated.

* * * * *